US008452301B2

(12) United States Patent
Keskitalo et al.

(10) Patent No.: US 8,452,301 B2
(45) Date of Patent: May 28, 2013

(54) METHOD AND APPARATUS FOR SELECTING A CODING FORMAT

(75) Inventors: Ilkka Keskitalo, Oulu (FI); Jani Paavo Johannes Puttonen, Palokka (FI)

(73) Assignee: Nokia Corporation

( * ) Notice: Subject to any disclaimer, the term of this patent is extended or adjusted under 35 U.S.C. 154(b) by 239 days.

(21) Appl. No.: 12/719,116

(22) Filed: Mar. 8, 2010

(65) Prior Publication Data
US 2011/0217984 A1    Sep. 8, 2011

(51) Int. Cl.
*H04M 1/00* (2006.01)
*H04W 72/00* (2009.01)
*H04B 3/46* (2006.01)

(52) U.S. Cl.
USPC ......... 455/452.2; 455/561; 455/450; 375/228

(58) Field of Classification Search
USPC ...... 455/452.1, 452.2; 370/294, 342; 375/228
See application file for complete search history.

(56) References Cited

U.S. PATENT DOCUMENTS

| 7,313,737 B2* | 12/2007 | Gronberg et al. ............. 714/704 |
| 7,937,111 B2* | 5/2011 | Ishii et al. ..................... 455/561 |
| 2003/0002450 A1* | 1/2003 | Jalali et al. ..................... 370/294 |
| 2004/0137908 A1* | 7/2004 | Sinivaara et al. .......... 455/452.1 |
| 2007/0066242 A1 | 3/2007 | Yi et al. |
| 2009/0274204 A1* | 11/2009 | Chen et al. ..................... 375/228 |
| 2011/0217983 A1* | 9/2011 | Morimoto et al. ............ 455/450 |

FOREIGN PATENT DOCUMENTS

| EP | 1 973 253 A1 | 9/2008 |
| EP | 2091275 A | 8/2009 |
| WO | WO 02/093951 A1 | 11/2002 |
| WO | WO 2008/025366 A1 | 3/2008 |
| WO | WO 2008/156304 A2 | 12/2008 |

OTHER PUBLICATIONS

International Search Report from International Application No. PCT/FI2011/050159, mailed May 20, 2011.
Kim, J.Y. et al.: "Enhanced Adaptive Modulation and Coding Schemes Based on Multiple Channel Reportings for Wireless Multicast Systems", IEEE $62^{nd}$ Vehicular Technology Conference, VTC-2005-Fall, Sep. 25-28, 2005, Dallas, TX, USA; pp. 725-729.

* cited by examiner

*Primary Examiner* — Kent Chang
*Assistant Examiner* — Ngan Pham Lu
(74) *Attorney, Agent, or Firm* — Alston & Bird LLP

(57) ABSTRACT

In accordance with an example embodiment of the present invention, channel quality data is collected in a cellular communication network on a cell level. The channel quality data is used to determine a signal format for use in common downlink channels, wherein the signal format may comprise, for example, a modulation scheme or code rate for use in the common downlink channels.

15 Claims, 3 Drawing Sheets

METHOD AND APPARATUS FOR SELECTING A CODING FORMAT

TECHNICAL FIELD

The present application relates generally to management of cellular communication networks, and in detail to selecting signal formats for use in common channels.

BACKGROUND

Cellular communication networks operating according to code division multiple access, CDMA, orthogonal frequency division multiple access, OFDMA, or time division multiple access, TDMA, or combinations thereof, for example, may be endowed with dedicated and non-dedicated channels. Non-dedicated channels may be referred to as common channels. For example downlink common channels are transmitted by a base station and are receivable by all terminals in the cell. Examples of downlink common channels include physical downlink control channel, PDCCH, and physical broadcast channel, PBCH, of the long term evolution, LTE, cellular system.

To improve reliability of communication in cellular systems, communication channels thereof are transmitted in coded form, which may be referred to as channel coding. Channel coding may comprise convolutional coding, block coding or turbo coding, for example. When a payload frame is channel coded, the length of the frame is increased by so-called redundancy information. The ratio of the number of payload bits to the coded frame length may be referred to as code rate k/n. This means that for every k bits of payload, the coder generates n bits of data. For example a rate of ⅓ may indicate that one third of the bits of a coded frame are payload bits and two thirds are redundancy bits. ½ may indicate that half of the bits are payload and half are redundancy bits. Redundancy bits enable receivers to detect and, in some cases, correct errors that occur in transmission.

Having a low code rate means that there are more redundancy bits relative to the number of payload bits, when compared to a high code rate. This means that the coded data is more robust against transmission errors, but transmitting the payload bits requires more resources since many redundancy bits need to be transmitted to ensure the payload is successfully communicated. Having a high code rate on the other hand inserts fewer redundancy bits, which means that whereas the payload bits require fewer resources for transmission, the data is less robustly protected from corruption en route. Selecting the code rate therefore presents a trade-off between efficient usage of resources on the one hand, and reliability on the other.

SUMMARY

Various aspects of examples of the invention are set out in the claims.

According to a first aspect of the present invention, there is provided an apparatus, comprising logic circuitry configured to obtain statistical information relating to channel quality indications received from a plurality mobile terminals in at least one cell, memory configured to store the statistical information relating to the channel quality indications, the logic circuitry configured to select a signal format for a common channel at least in part based on the statistical information relating to the channel quality indications.

According to a second aspect of the present invention, there is provided a method, comprising obtaining statistical information relating to channel quality indications received from a plurality mobile terminals in at least one cell, storing the statistical information relating to the channel quality indications, selecting a signal format for a common channel at least in part based on the statistical information relating to the channel quality indications, and either sending an indication of the selected signal format toward a base station or taking the selected signal format into use in a base station.

According to a third aspect of the present invention, there is provided a computer program product comprising a computer-readable medium bearing computer program code embodied therein for use with a computer, the computer program code comprising code for obtaining statistical information relating to channel quality indications received from a plurality mobile terminals in at least one cell, code for storing the statistical information relating to the channel quality indications, code for selecting a signal format for a common channel at least in part based on the statistical information relating to the channel quality indications; and code for either sending an indication of the selected signal format toward a base station or taking the selected signal format into use in a base station.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
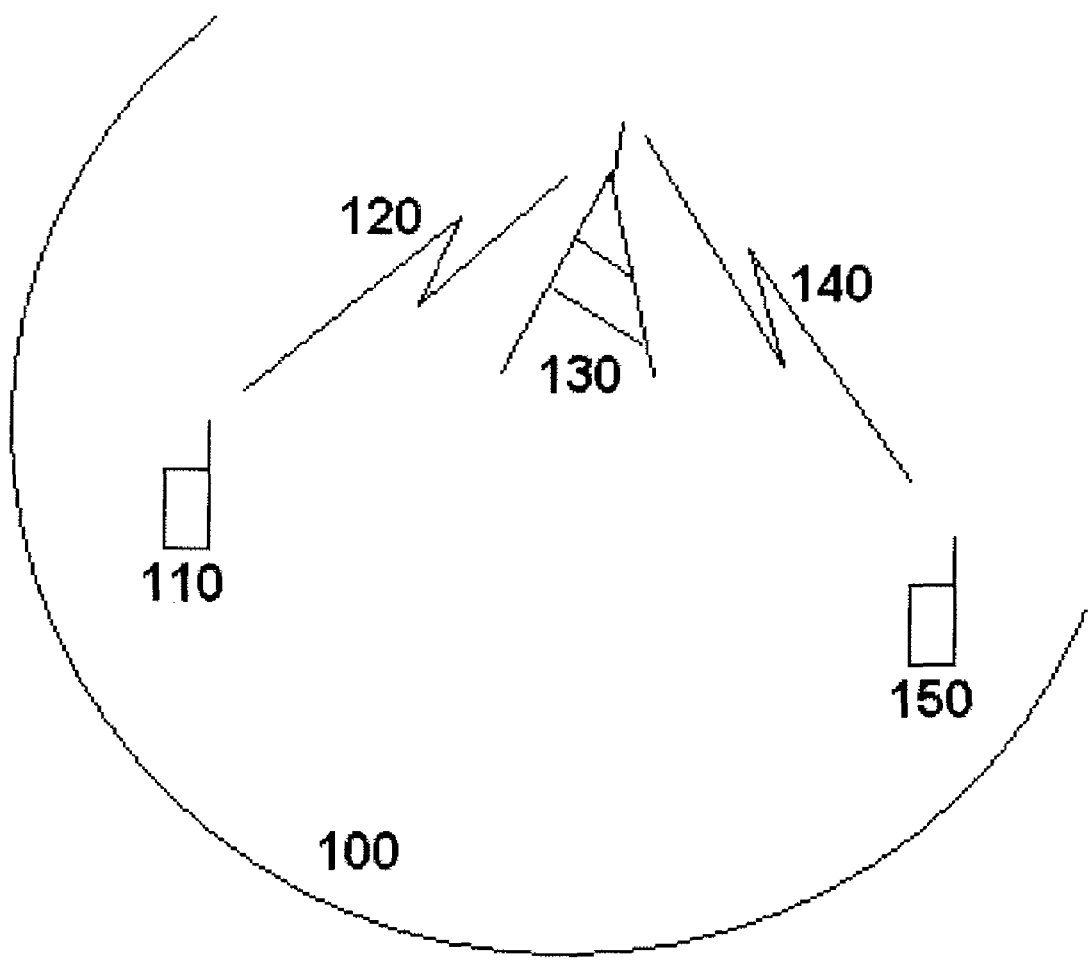
FIG. 1 illustrates an example of a cell operating according to some embodiments of the invention.
Figure 2:
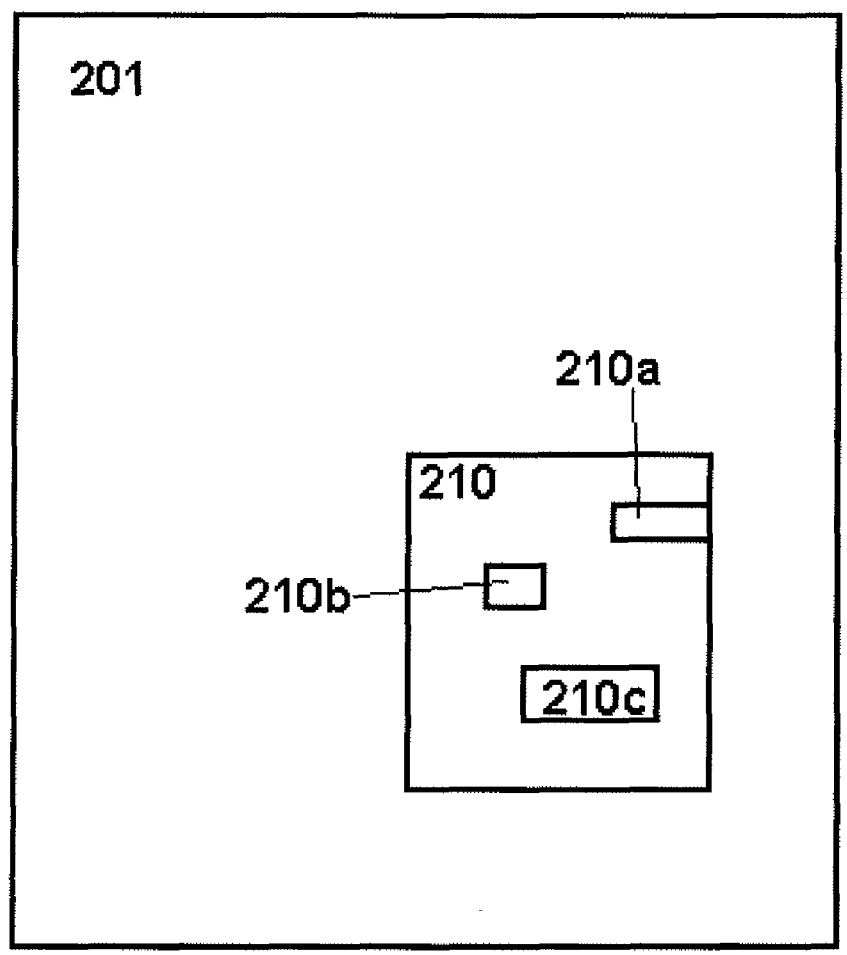
FIG. 2 illustrates an example apparatus capable of supporting embodiments of the invention.
Figure 3:
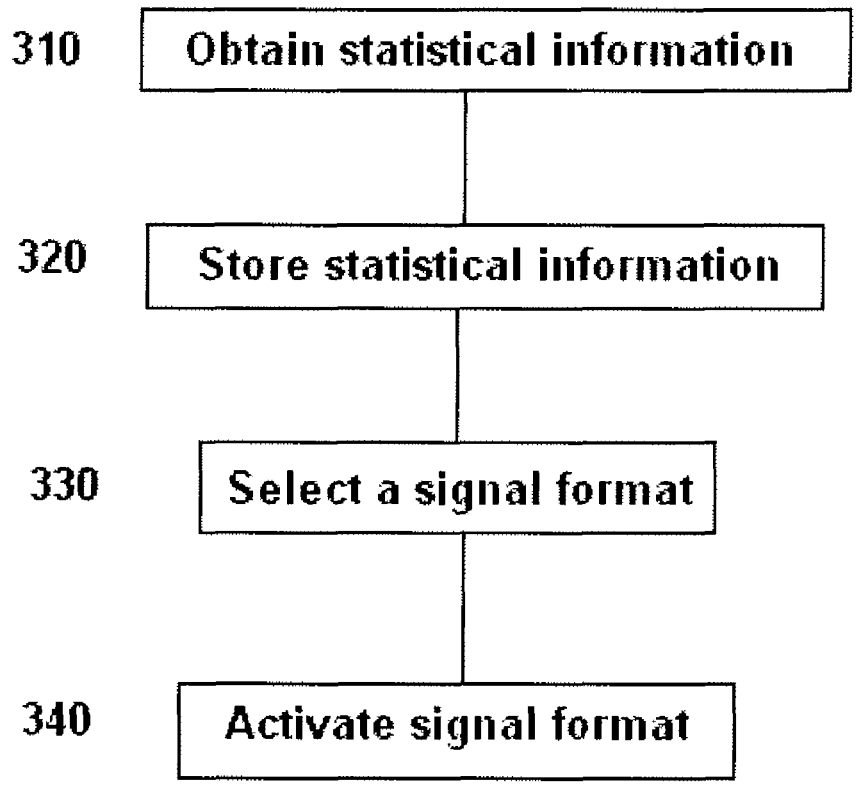
FIG. 3 is a flowchart illustrating an example embodiment of the invention.

An example embodiment of the present invention and its potential advantages are understood by referring to FIGS. 1 through 3 of the drawings.

FIG. 1 illustrates an example of a cell 100 operating according to some embodiments of the invention. The cell 100 contains base station 130. The base station 130 may operate according to the LTE standard or, for example, a variant of the wide-band code division multiple access, WCDMA, standard. The base station 130 communicates with terminals 110 and 150, which may be essentially similar to each other for the purposes of describing the present invention. The base station communicates with terminal 110 via radio link 120. The base station communicates with terminal 150 via radio link 140. Radio links 120 and 140 may comprise uplink and downlink channels, wherein uplink channels convey information toward the base station and downlink channels convey data from the base station to the terminals. Downlink channels may be dedicated to a certain terminal or meant for reception by more than one terminal in the cell. Common downlink channels are meant to be received by all terminals in the cell.

Selecting a code rate for a common downlink channel represents a trade-off. In large cells, terminals near the cell edge need to receive common downlink channels, such as PDCCH in LTE, even though the radio path between them and the base station 130 may have a high pathloss. For such terminals, a low code rate is suitable since it includes more redundancy information and provides more robustness against transmission errors. In smaller cells on the other hand pathloss to the cell edge may be substantially lower. Smaller cells may also experience high traffic since making cells smaller is one way to increase network-level capacity. Therefore in smaller cells robustness against errors may be less important and conversely efficient use of radio resources more important. Therefore in smaller cells using a high code rate may be suitable unless interference caused, for example, by high traffic levels makes a lower code rate more attractive. This illustrates that different cells may have different optimal choices for the code rate. It is not necessarily the case that all small cells have optimal code rates for common downlink channels that are higher than those of larger cells. Discovering the optimal code rate for common downlink channels depends on factors of the cell such as, for example, size of the cell and its interference levels. The optimal code rate may vary according to, for example, the time of day if the cell is highly loaded at certain times, and less loaded at other times.

When communicating with base station 130, terminals such as terminal 110 may measure the strength of a downlink channel and report it to the base station 130. This reporting may be accomplished by a channel quality indication, CQI. The base station may use the reported CQI when making scheduling decisions. The CQI may be a quantized variable of, for example, five bits which is sent in channel coded format from terminal 110 to base station 130. The CQI may also have less than five bits, even only one bit, or more than five bits. The more bits are used to represent the CQI, the greater the accuracy that the terminal can report the downlink signal quality to the base station. To determine the CQI, terminal 110 may compute received signal-to-interference ratios for one or more received downlink channels. The CQI may be reported from active-mode channels, in other words when the terminal 110 is engaged in active communications via the base station 130.

The base station 130 may use a certain signal format when sending data to terminals in its cell. A signal format may comprise various aspects of a transmission such as channel coding method, code rate, modulation scheme and power level. Examples of modulation schemes include binary phase-shift keying, BPSK, quadrature phase-shift keying, QPSK, and various quadrature amplitude modulations, such as 16-QAM. A power level used may comprise a power level offset relative to another channel in use or an absolute power level value. When changing a signal format a base station may change one or more of the mentioned aspects. Aspects of signal format such as, for example, modulation and power offset may be dynamically configurable, for example a channel may have its power level temporarily boosted to overcome a path fading condition. A system information channel may inform terminals of dynamically varying aspects of signal formats in use.

The base station may be configured to receive CQI reports from terminals in the cell and use them for scheduling transmissions to the terminals. According to some embodiments of the invention, the base station may also be configured to derive statistical information of the received CQI values. Statistical information may comprise a distribution of CQI values or an average value of CQI values, for example. A distribution of CQI values may be used to derive metrics, such as information on the number of CQI reports under a certain threshold value relative to the overall number of CQI reports. Such information may comprise, for example, information that a certain percentage of CQI reports are below the threshold. A distribution of CQI values may alternatively or in addition be used to derive metrics comprising information on an average value of CQI reports, and a standard deviation of the received CQI reports. The threshold may correspond to an outage, so that terminals reporting a CQI less than the threshold value may be considered to be in outage, meaning that their received downlink signal quality is below a minimum quality level. The threshold may alternatively correspond to the minimum quality level incremented by a margin. Metrics derived from a distribution of CQI values may be used to optimize common downlink channels, for example.

According to some embodiments of the invention, the base station 130 transmits the received CQI reports to at least one further network apparatus, not illustrated in FIG. 1. In these embodiments, at least one of the further network apparatuses derives statistical information from the CQI reports. Examples of further network apparatuses include radio network controllers, RNCs, switches, support nodes, serving gateways, gateway nodes and servers in the network. RNCs may be connected to a plurality of base stations and be configured to receive CQI reports from the plurality of base stations. The further network apparatus may be comprised in a network management system, which would centralize management of the network and facilitate its control. In some embodiments of the invention, the deriving of statistical information from the CQI reports is entrusted to one of these further network apparatus types. The further network apparatus may, after deriving the statistical information, transmit it to base station 130, for example. The base station may thus obtain the statistical information either by deriving it from received CQI reports, or by receiving it from a further network apparatus. The base station 130 may use the statistical information to select a signal format for at least one common downlink channel. The further network apparatus may alternatively, after deriving the statistical information, use it to select a signal format for at least one common downlink channel and send base station 130 an indication which allows the base station 130 to determine the selected signal format.

In embodiments where a further network apparatus selects a signal format, the further network apparatus may be configured to combine CQI reports received from a plurality of cells to derive common statistical information, which the further network apparatus may be configured to use to select a common signal format. In these embodiments the cells may be located as cluster, in other words nest to each other. The cells may share characteristics, such as size or expected traffic conditions.

The signal format may be selected so that acceptable communication quality is ensured throughout the cell or cells in which the signal format will be used. In detail, if the statistical information indicates that a significant fraction of terminals in a cell report unsatisfactory signal quality, a signal format comprising more redundancy bits may be used to overcome the unsatisfactory signal quality. If the statistical information indicates that a significant fraction of terminals in a cell report unsatisfactory signal quality, a signal format with a lower-order modulation scheme such as BPSK or QPSK, for example, may be selected. If almost all terminals in a cell report satisfactory or good signal quality, a signal format with less redundancy bits may be selected. If almost all terminals in a cell report satisfactory or good signal quality, a signal format with a higher-order modulation scheme such as 16-QAM or 32-QAM, for example, may be selected. In some embodiments, only the modulation scheme is modified responsive to the statistical information. In other embodiments, only the code rate is modified responsive to the statistical information. In yet further embodiments, both code rate and modulation scheme may be modified responsive to the statistical information.

In addition or alternatively to active mode CQI measurements, data from other signal level measurements may be used. The aforementioned threshold level may be adapted dynamically based on performance indicators gathered during network operation. The derivation of statistical information and selection of signal format may be repeated at set time intervals, or responsive to unsatisfactory performance in the network, for example in downlink common channel reception at terminals. When the derivation of statistical information and selection of signal format is repeated at set time intervals, the network may thereby react to a running average of CQI-derived statistics to enable a dynamic and time-varying management of the network.

FIG. 2 illustrates an example apparatus 201 capable of supporting embodiments of the present invention. The apparatus may correspond to base station 130 of FIG. 1, for example, or a further network apparatus. The apparatus is a physically tangible object, for example a base station, gateway, server or other kind of network apparatus. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210a configured to enable the apparatus 201 to connect to a network. The apparatus may comprise memory 210b configured to store information, for example information relating to channel quality indications or a threshold value. The memory may be solid-state memory, dynamic random access memory (DRAM), magnetic, holographic or other kind of memory. The apparatus may comprise logic circuitry 210c configured to access the memory 210b and control the transceiver circuitry 210a. The logic circuitry 210c may be implemented as software, hardware or a combination of software and hardware. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transceiver circuitry 210a. The logic circuitry 210c may be control circuitry. The transceiver circuitry 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transceiver circuitry 210a, memory 210b and logic circuitry 210c may be comprised in the apparatus as hardware elements such as integrated circuits or other electronic components. The same applies if the apparatus 201 does comprise a control apparatus 210 but some, or all, of the transceiver circuitry 210a, memory 210b and logic circuitry 210c are not comprised in the control apparatus 210.

FIG. 3 is a flowchart illustrating an example embodiment of the invention. In phase 310, statistical information relating to channel quality indications is obtained. The obtaining may comprise deriving it from the channel quality indications or receiving it in a signaling message. The statistical information may comprise information as described above in connection with FIG. 1.

In phase 320 the obtained statistical information is stored. This may comprise storing the statistical information in memory 210b, for example.

In phase 330 a signal format is selected using the statistical information as one input. In some embodiments, phase 330 may precede phase 320.

In phase 340 the signal format is activated. This may comprise taking the signal format into use in a base station, or signaling an indication of the selected signal format toward a base station, for example via intermediary network nodes if the base station is not adjacent to an apparatus selecting the signal format in a network topology.

Without in any way limiting the scope, interpretation, or application of the claims appearing below, a technical effect of one or more of the example embodiments disclosed herein is that since active-mode measurements are used to optimize downlink common channels on a level of a cell or a cluster of cells, idle-mode measurements do not need to be conducted to accomplish this. Another technical effect of one or more of the example embodiments disclosed herein is that CQI or signal-level reporting may be averaged over a large number of users, yielding high-quality data on coverage quality of a cell.

Embodiments of the present invention may be implemented in software, hardware, application logic or a combination of software, hardware and application logic. The software, application logic and/or hardware may reside in memory 210b, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer. A storage medium does not refer to a transitory transmission signal.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   logic circuitry configured to obtain statistical information relating to channel quality indications received from a plurality of mobile terminals in more than one cell; and
   memory configured to store the statistical information relating to the channel quality indications;
   the logic circuitry configured to select, responsive to a determination that there is unsatisfactory performance in a network, a signal format for a common channel at least in part based on the statistical information relating to the channel quality indications;
   wherein the apparatus further comprises transceiver circuitry configured to send an indication of the selected signal format toward a base station.

2. An apparatus according to claim 1, wherein the transceiver circuitry is further configured to receive channel quality indications from a plurality of mobile terminals, and wherein the logic circuitry is further configured to cause the apparatus to take the selected signal format into use.

3. An apparatus according to claim 1, wherein selecting the signal format comprises selecting at least one of a code rate and a modulation scheme.

4. The apparatus of claim 1, wherein the channel quality indications relate to active mode measurements of channels used for communication.

5. A method, comprising:
obtaining statistical information relating to channel quality indications received from a plurality of mobile terminals in more than one cell;
causing the statistical information relating to the channel quality indications to be stored;
selecting, responsive to a determination that there is unsatisfactory performance in a network, a signal format for a common channel at least in part based on the statistical information relating to the channel quality indications; and
causing an indication of the selected signal format to be sent toward a base station.

6. The method of claim 5, further comprising taking the selected signal format into use.

7. The method of claim 5, wherein the channel quality indications relate to active mode measurements of channels used for communication.

8. The method of claim 5, wherein selecting the signal format comprises selecting at least one of a code rate and a modulation scheme.

9. An apparatus, comprising:
at least one processor; and
at least one memory including computer program code,
the at least one memory and the computer program code configured to, with the at least one processor, cause the apparatus to, at least:
obtain statistical information relating to channel quality indications received from a plurality of mobile terminals in more than one cell;
cause the statistical information relating to the channel quality indications to be stored;
select, responsive to a determination that there is unsatisfactory performance in a network, a signal format for a common channel at least in part based on the statistical information relating to the channel quality indications; and
cause an indication of the selected signal format to be sent toward a base station.

10. The apparatus of claim 9, wherein the channel quality indications relate to active mode measurements of channels used for communication.

11. The apparatus of claim 9, wherein the apparatus is caused to select the signal format by selecting at least one of a code rate and a modulation scheme.

12. A computer program product comprising a non-transitory computer-readable medium bearing computer program code embodied therein, the computer program code being configured to, upon execution, cause an apparatus to at least:
obtain statistical information relating to channel quality indications received from a plurality of mobile terminals in more than one cell;
cause the statistical information relating to the channel quality indications to be stored;
select, responsive to a determination that there is unsatisfactory performance in a network, a signal format for a common channel at least in part based on the statistical information relating to the channel quality indications; and
cause an indication of the selected signal format to be sent toward a base station.

13. A computer program product according to claim 12, wherein selecting the signal format comprises selecting at least one of a code rate and a modulation scheme.

14. A computer program product according to claim 12, wherein the channel quality indications relate to active mode measurements of channels used for communication.

15. The computer program product of claim 12, wherein the apparatus is further caused to take the selected signal format into use.

* * * * *